(12) United States Patent
Salvarani et al.

(10) Patent No.: US 8,627,064 B2
(45) Date of Patent: Jan. 7, 2014

(54) FLEXIBLE SYSTEM AND METHOD TO MANAGE DIGITAL CERTIFICATES IN A WIRELESS NETWORK

(75) Inventors: Alexandro F. Salvarani, Edison, NJ (US); Fred Davant, Plaisir (FR)

(73) Assignee: Alcatel Lucent, Paris (FR)

( * ) Notice: Subject to any disclaimer, the term of this patent is extended or adjusted under 35 U.S.C. 154(b) by 192 days.

(21) Appl. No.: 13/155,614

(22) Filed: Jun. 8, 2011

(65) Prior Publication Data

US 2012/0246466 A1  Sep. 27, 2012

Related U.S. Application Data

(60) Provisional application No. 61/467,089, filed on Mar. 24, 2011.

(51) Int. Cl.
*H04L 29/06* (2006.01)

(52) U.S. Cl.
USPC .............................. 713/156; 713/157; 726/10

(58) Field of Classification Search
USPC ..................................... 713/156, 157; 726/10
See application file for complete search history.

(56) References Cited

U.S. PATENT DOCUMENTS

| 2006/0047949 A1* | 3/2006 | Brown et al. ................. 713/156 |
| 2010/0070771 A1 | 3/2010 | Chen et al. |
| 2010/0318788 A1 | 12/2010 | Salvarani et al. |

FOREIGN PATENT DOCUMENTS

WO PCT/US2012/025782  5/2012

OTHER PUBLICATIONS

3GPP: "3rd Generation Partnership Project; Technical Specification Group Service and System Aspects; Network Domain Security (NDS); Authentication Framework (AF) (Release 10)", 3GPP TS 33.310 V10.2.0 Draft; 33310-A20, 3rd Generation Partnership Project (3GPP), Mobile Competence Centre; 650, Route Des Lucioles; F-06921 Sophia-Antipolis Cedex; France, vol. SA WG3,(Dec. 21, 2010),XP050525829, [retrieved on Dec. 21, 2010]. sec. 1;5.1.1;5.2.2.1;5.2.9.4;5.2.11;5.2.15;6.1.3b;6.1.4b;fig.6;sec.7.2;9.2; fig.7;sec. 9.4;9.5.1;9.5.4;annex G.

"3rd Generation Partnership Project; Technical Specification Group Services and System Aspects; 3G Security; Network Domain Security/Authentication Framework (NDS/AF) Feasibility study to support NDS/IP evolution (Release 6)", 3GPP Standard; 3GPP TR 33.810, 3rd Generation Partnership Project (3GPP), Mobile Competence Centre; 650, Route Des Lucioles; F-06921 Sophia-Antipolis Cedex; France, No. V6.0.0, Dec. 1, 2002, pp. 1-27, XP050376871, section 4.2, section 6.3, section 6.8.2.

(Continued)

*Primary Examiner* — Jeffrey Pwu
*Assistant Examiner* — Thong Truong
(74) *Attorney, Agent, or Firm* — Wolff & Samson

(57) ABSTRACT

An infrastructure is provided for managing the distribution of digital certificates for network security in wireless backhaul networks. In embodiments, a root certificate management system (root CMS) processes requests for digital certificates, issues root certificates, automatically authenticates surrogate certificate management systems (sur-CMSs), and automatically processes certificate requests and issues certificate bundles to sur-CMSs that are successfully authenticated. The infrastructure includes sur-CMSs to which are assigned base stations within respective regions. Each sur-CMS automatically authenticates its own base stations and automatically processes certificate requests and issues certificate bundles to base stations that are successfully authenticated. A certificate bundle issued to a base station includes a digital certificate, signed by the issuing sur-CMS, of a public key of such base station, and at least one further digital certificate, including a self-signed certificate of the root CMS.

10 Claims, 10 Drawing Sheets

(56) References Cited

OTHER PUBLICATIONS

PCT International Search Report corresponding to PCT Application No. PCT/US2012/025782 filed Feb. 20, 2012. International Search Report issued May 31, 2012, pp. 1-5.

PCT Written Opinion of the International Searching Authority corresponding to PCT Application No. PCT/US/2012/025782, filed Feb. 20, 2012. Written Opinion issued May 31, 2012, pp. 6-11.

* cited by examiner

FLEXIBLE SYSTEM AND METHOD TO MANAGE DIGITAL CERTIFICATES IN A WIRELESS NETWORK

CROSS-REFERENCE TO RELATED APPLICATION

This application claims priority of Provisional Application Ser. No. 61/467,089 which was filed on Mar. 24, 2011.

FIELD OF THE INVENTION

The present invention relates to systems and methods to manage security digital certificates used by network elements in a wireless network to authenticate security protocols.

ART BACKGROUND

The Radio Access Network (RAN) in wireless networks has been evolving from a circuit-switched network to a packet-switched network to meet the growing need to carry wireless high speed packet data and to interface and operate with other packet data networks. The advent of 4G wireless, and LTE technology in particular, has imposed a faster and flatter network architecture with an all-IP base protocol for communication. Relative to older networks, the LTE network, for example, has fewer anchor points, greater distribution of control logic at the edge, and high cell bandwidth that drives transport sharing among multiple operators. One consequence is that RAN network elements (NEs) such as computers, servers, routers, and base stations, as well as the interfaces between them, are exposed to IP traffic. This introduces security threats and vulnerabilities to the NEs at the network layer and higher layers. There remains a need to resolve such threats and vulnerabilities.

One defensive measure that network operators have adopted to protect the RAN network elements from such threats and vulnerabilities has been to implement secure versions of the communication protocols used by the RAN. One example is the suite of secure protocols known as IP security ("IPsec"), which was developed by the Internet Engineering Task Force (IETF) to support secure exchange of packets at the IP layer.

Among other advantageous properties, IPsec is scalable so that it can be supported in networks of all sizes from LANs to global networks. It operates at low network layers, and thus is unaffected by users, applications and higher-level protocols. It is not limited to specific applications. It does not require the upgrade of the transport protocols (for example TCP, UDP, SCTP) or of higher-layer protocols (for example http, ftp, SSH) and applications. IPsec can encapsulate IP packets to form IPsec tunnels, which preserve the original properties of the packets and provide secure VPNs at the network layer.

IPsec supports source authentication, integrity protection, and encryption on a packet-by-packet basis. To do so, IPsec relies on a secret key that is shared between the two IPsec peers, and on the execution of several symmetric cryptographic algorithms ("symmetric cipher algorithms") that are agreed between the two peers during IPsec activation. The symmetric cipher algorithms use session keys that IPsec derives from pre-established keys stored in each IPsec peer. A protocol referred to as Internet Key Exchange ("IKE") effectuates the key negotiation and key agreement during IPsec activation and when keys are refreshed.

IKE is the first protocol that runs when IPsec is activated. Although the two current standard versions of IKE, namely IKEv1 and IKEv2, are mutually incompatible, they have certain properties in common, which we now briefly describe. Both versions of IKE perform a message exchange in two phases. In the first phase, IKE sets a secure channel to set up a Security Association between the two IPsec peers. In the second phase, the IKE peers authenticate each other. If either phase fails, then the IPsec connection is terminated.

Several alternative methods of IKE authentication are known. In one widely used method, X.509 digital certificates are exchanged between the two IPsec peers during the IKE authentication phase. In accordance with well-known procedures, the digital certificates are obtained from a Certification Authority (CA). Digital certificates provide great flexibility to bind the public key to many identity types, data information and formats. X.509 is a standard from ITU-T for a public key infrastructure. ITU-T is the Telecommunication Standardization Sector of the International Telecommunication Union.

For example, a base station, a server in the LTE backhaul network, or some other entity acting as IP host, can bind the host public key to the host identity by inserting the public key and the host identity as parameters in the host digital certificate so that the IP host certificate will contain both of these parameters.

Methods using of digital certificates for IKE mutual authentication are advantageous because, among other reasons, they are scalable: The number of certificates required in a network of nodes to authenticate each node when IPsec is activated is linear with the number of nodes.

During IKE authentication, each peer exchanges a certificates bundle (a bundle typically holds one to three certificates) to provide proof of its identity. The bundle forms a delegation chain of certificates that define a trusted path starting from the identity of the IP host all the way to an anchor that is trusted by the recipient. If the delegation chain can be validated, certificate-to-certificate, from the trusted anchor to the peer certificate, then the IKE peer is authenticated. For the authentication procedure to complete successfully, each IKE peer needs to be provisioned with the correct bundle of certificates, or else the IKE authentication phase will fail.

There is a need to automate the procedure for managing and refreshing the digital certificates so that the demands of large networks such as the wireless backhaul can be met.

SUMMARY OF THE INVENTION

We have developed an automated method for the management of digital certificates in a large wireless backhaul network. We refer to our automated method as a hierarchical methodology because it relies on two or more levels of nodes that manage digital certificates. Later, we will describe several implementations, each having a particular model hierarchy of nodes involved in certificate delegation. In each of the implementations that are to be described, it is assumed that the management of certificates is performed via a secure and authenticated channel so that only legitimate credentials are sent to and accepted by the IKE peers.

Accordingly, in a system implementation, a root certificate management system (root CMS) is authorized to issue root certificates. The root CMS is configured to automatically authenticate surrogate certificate management systems (sur-CMSs), and to automatically issue a certificate bundle to any sur-CMS that is successfully authenticated. The system includes two or more sur-CMSs, each of which has one or more base stations assigned to it within a respective region. Each sur-CMS is configured to automatically authenticate its own base stations and to automatically issue a certificate bundle to each base station that it successfully authenticates. Each certificate bundle issued to a base station includes a digital certificate, signed by the issuing sur-CMS, of a public key of such base station. Each certificate bundle issued to a base station also includes at least one further digital certificate, including a self-signed certificate of the root CMS.

BRIEF DESCRIPTION OF THE DRAWINGS

FIG. 3 is a schematic diagram of a model in which there is no operator Certification authority (CA) and every node trusts the CA of the ROOT CMS.

FIG. 4 is a schematic diagram of a model in which the operator owns a CA and every node trusts the operator CA.

FIG. 5 is a schematic diagram of a direct cross-certification model in which there is an operator CA, the base stations trust the CA of the ROOT CMS, and the SEGs trust the operator CA.

DETAILED DESCRIPTION

Figure 1:
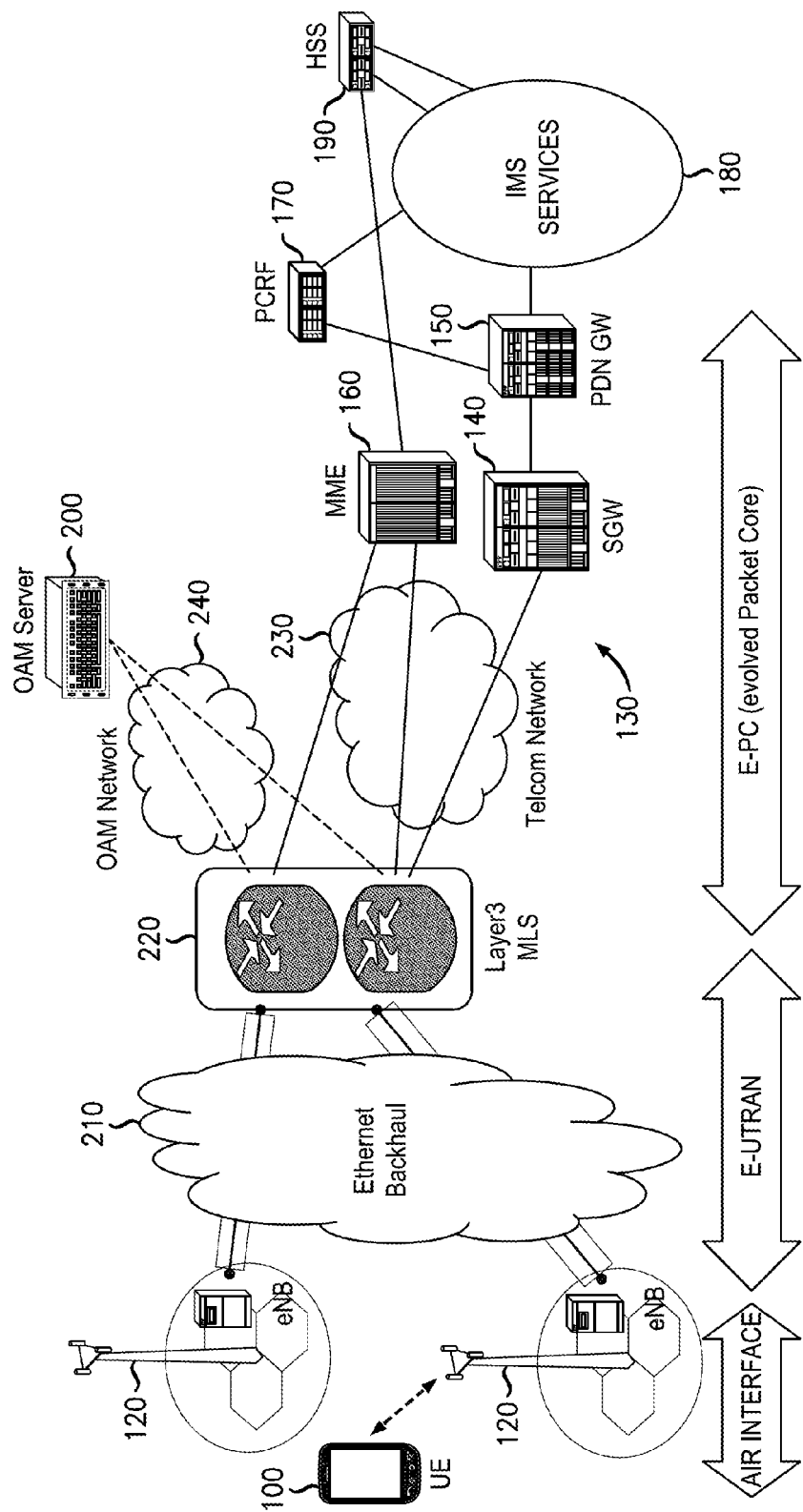
FIG. 1 is a high-level schematic diagram of a typical LTE network.

We will first briefly describe the broad features of LTE networks with reference to FIG. 1. Although the invention will be described with specific reference to its implementation in LTE networks, such description is purely for purposes of illustration, and not intended to imply that the scope of application of the invention is so limited. For example, other kinds of networks in which our method in its broad aspect may be implemented include WiFi, WCDMA, CDMA/EVDO, and GSM.

LTE is a Fourth Generation enhancement to UMTS telecommunication that includes an all-IP networking architecture. LTE is being introduced through a series of releases by the 3rd Generation Partnership Project (3GPP). In LTE, the GPRS core network is replaced by the System Architecture Evolution (SAE), which is a flat, IP-based network architecture. Because LTE is all-IP from end to end, the mobile handsets and other terminal devices 100 for LTE have embedded IP capabilities, and the base stations 120, referred to as Evolved NodeBs (eNodeBs) are IP-based.

The Evolved Packet Core (EPC) 130 is the main architectural component of SAE. It will be seen from the figure that the EPC comprises four elements: the Serving Gateway (SGW) 140, the Packet Data Network Gateway (PGW) 150, the Mobility Management Entity (MME) 160, and the Policy and Charging Rules Function (PCRF) 170. The SCW, PGW, and MME were introduced in 3GPP Release 8, and the PCRF was introduced in 3GPP Release 7.

The SGW is a data plane element. Its primary function is to manage user-plane mobility and to act as a demarcation point between the radio access network (RAN) and the core networks. The SGW maintains data paths between eNodeBs and the PGW.

The PGW is the termination point of the packet data interface toward the packet data networks. As such, it is the entry and exit point for traffic for the UEs, i.e., for the user terminals. The PGW supports operator-defined policy for resource allocation and usage, packet filtering, and charging.

The MME performs the signaling and control functions to manage the UE access to network connections, the assignment of network resources, and the management of the mobility states to support tracking, paging, roaming, and handovers, as well as all other control-plane functions related to subscriber and session management.

The PCRF supports service data flow detection, policy enforcement, and flow-based charging. (In LTE, a service data flow—SDF—is the virtual connection that carries data-plane traffic.)

Also shown in the figure in connection with the EPC is IMS Administrative Network 180 for supporting IMS services, and Home Subscriber Server (HSS) 190, which includes a user database and supports the IMS network entities that handle calls by providing subscriber authentication, location, and subscription services, among others. Also shown in the figure is OAM server 200, which provides operation, administration, and maintenance functions for the LTE network.

With further reference to FIG. 1, it will be seen that an Ethernet backhaul network 210 connects the eNodeBs to each other and to the EPC. Various interconnections between the Radio Access Network, which includes eNodeBs 120 and network 210, may be mediated by network-level multilayer switch (MLS) 220. Communication networks 230 and 240 may be provided for communication between the backhaul and the EPC and OAM server, respectively. Networks such as networks 230 and 249 are typically private networks owned by the network operator.

Figure 2:
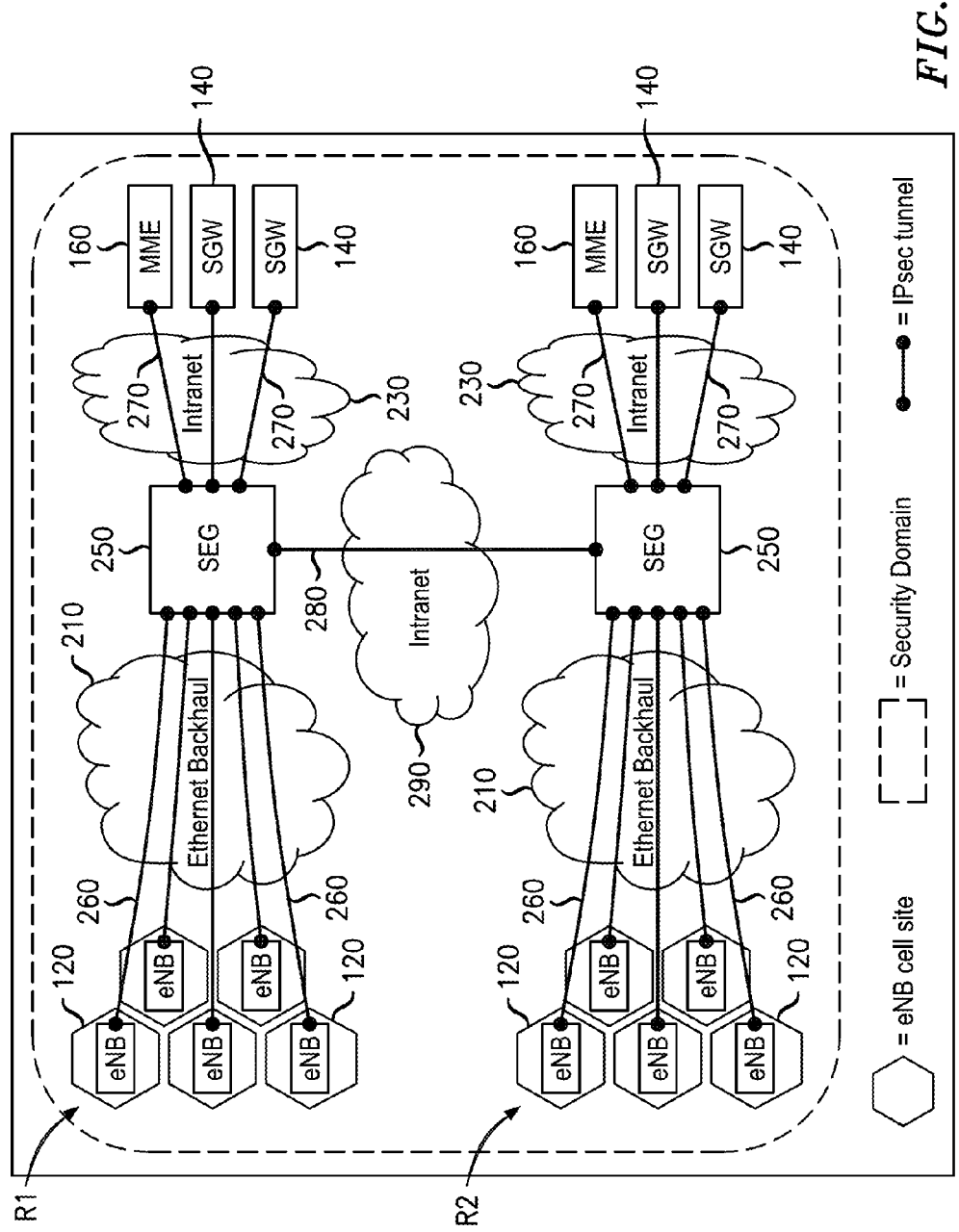
FIG. 2 is a high-level schematic diagram of a portion of an LTE network in which security measures have been implemented.

FIG. 2 shows one example of an LTE network architecture in which security measures have been implemented. Figure elements common with FIG. 1 are designated by like reference numerals. It will be seen in FIG. 2 that the network-level interlayer switching network (designated by reference numeral 220 in FIG. 1) now includes Security Gateway (SEG) 250. If the IPsec protocol suite has been implemented, the SEG may alternatively be referred to as an IPsec Gateway.

Because the mobile infrastructure is typically very large and includes very many nodes, it will often be advantageous to subdivide the RAN into mutiple regions, such as regions R1 and R2 of FIG. 2. Each region contains a plurality of base stations that, typically, are geographically situated relatively near to each other. For secure communication within a given region, the base stations in the region connect to a Security Gateway (SEG) aggregator directly via IPsec tunnels 260. For secure communication between regions, IPsec tunnels 280 across network 290 between SEGs situated in different regions are used to protect the perimeter of each region. Thus, for example, the tunnels 280 may be useful for protecting traffic during roaming on networks owned by third parties. IPsec tunnels 270 across networks 230 are useful, e.g., for protecting control-plane and user-plane traffic, including IMSI and other customer confidential information.

Our method will be implemented as an application infrastructure that manages, e.g., X.509 digital certificates. The application infrastructure will be executed on appropriate hardware machines which may be, for example, digital signal processors or special or general purpose digital computers. For such purpose, it may be provided as a set of instructions in source or object code or as a set of machine-executable instructions. Any of the preceding may be provided as embodied in a tangible, non-transitory machine-readable medium such as an optical disk, field-programmable gate array, or computer memory device.

As will be seen, the application infrastructure will trigger digital certificate requests in accordance with operator commands, sign digital certificates, and distribute the bundle of certificates to the IP nodes in the wireless backhaul network.

The application infrastructure may further be advantageously designed to support self configuration scenarios according to which, for example, a new IP node for Plug and Play or the like may be deployed in the field without technician support if it has been equipped with certificates from the factory that allows for initial authentication of the IP node.

The application infrastructure may further be advantageously designed to populate certificates in the IP host to support migration scenarios according to which, for example, a legacy IP node without certificates migrates from a previous software release to a new release. In doing so, the legacy IP node acquires remotely, and without the need for manual intervention, the certificate bundle that it needs in order to be authenticated by the IKE protocol in IPSec.

The application infrastructure will typically be hosted in a centralized platform fixed in the wireless network, but it can also be installed in a local platform such as a laptop computer. That is, the local platform may be configured to manage certificates at a local site such as a cell site, for the purpose, e.g., of downloading the IP host certificates for installation in newly deployed base stations that have not been provisioned at the factory with certificates and thus, as initially deployed, cannot authenticate themselves.

In another example of a local platform, the application infrastructure is used in, e.g., the factory to download the digital certificate bundle.

Our application infrastructure has two or more hierarchical levels. The use of plural levels, and in particular the use of two levels, is advantageous for simplifying the management of certificates, while also providing at least one intervening layer to isolate the root Certification authority from the users and thus to protect it from attackers seeking to gain, e.g., the private key.

More specifically, each management transaction is conducted locally, so that only a limited number of certificates need to be created and exchanged by each CMS to build the trusted path. Thus, the hierarchical layers not only add security via a layer of isolation, but they also provide local functionality to perform online certification requests. This, in turn, simplifies and speeds up the certification and cross-certification processes at the trusted authorities.

It should be noted in this regard that two, three, or even more hierarchical layers are readily accommodated in our infrastructure. However, there is a design tradeoff: If the number of hierarchical layers were too big, the number of certificate and signature validations during IKE authentication might be so large as to degrade performance and increase overhead to an intolerable level. On the other hand, if there were too few hierarchical layers, then there would be insufficient delegation of local functionality by the CMSs, and some of them could be overwhelmed by the large number of certificates they might need to create and exchange in response to requests from IP nodes of the network.

Accordingly, we found that a hierarchical model having two layers, or in some cases somewhat more, will generally be malleable enough to adjust to several different trust models of authority, while keeping overhead to a minimum. A "malleable" infrastructure would, for example, be able to support more than one certification authority and more than one model of trust. It is advantageous to have such a malleable infrastructure so that secure communication can be established with a third party that needs to introduce an external Certification authority.

Figure 3:
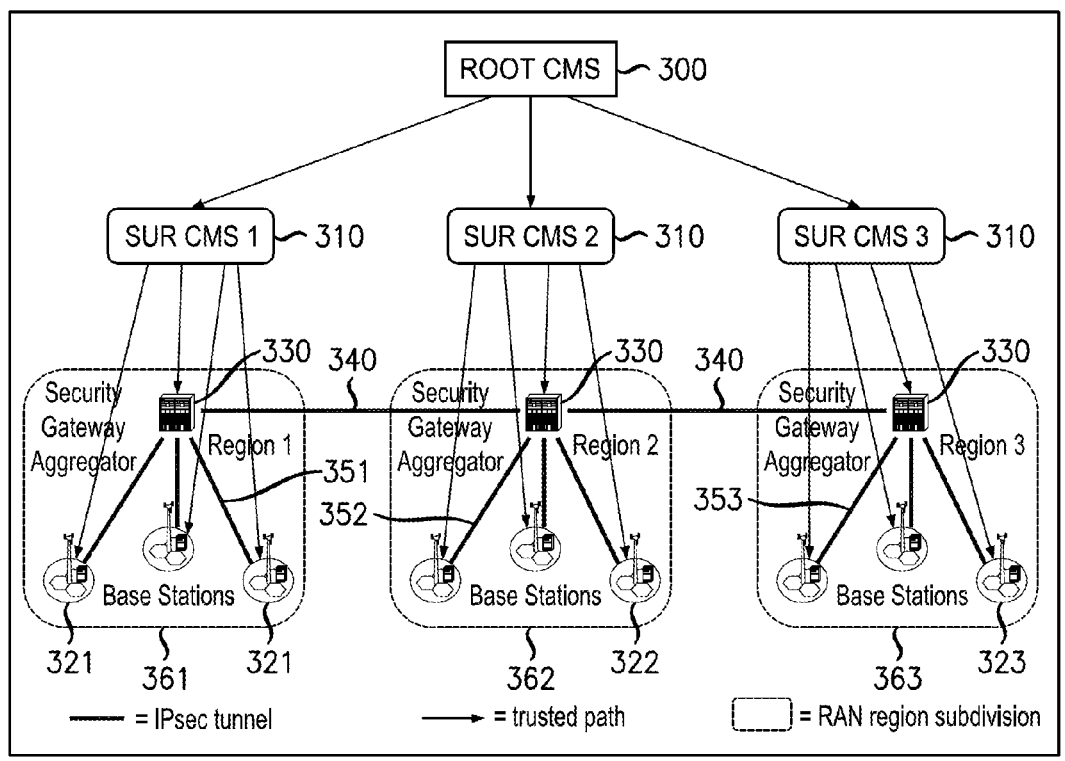
FIGS. 3-5 are schematic diagrams of various CMS hierarchical architecture models for managing digital certificates in a wireless network. Like elements of the respective figures are designated by like reference numerals.

FIG. 3 illustrates one possible architecture for implementing our application infrastructure in a wireless backhaul network. One important component of the architecture is a system application responsible for managing the digital certificates. We refer to such a system application as a Certificate Management System (CMS).

With reference to FIG. 3, it will be seen that a ROOT CMS application 300 sits at the top of the CMS hierarchy. In practical implementations, the ROOT CMS resides in a server in an OAM network such as network 240 of FIG. 1. Below ROOT 300 are multiple sur-CMS applications 310 that interface directly, in a local or remote manner, with the IP nodes in need of certificates. In practical implementations, the sur-CMS functionalities reside on platforms similar to that of the ROOT CMS. FIG. 3 has been simplified to show only three sur-CMS applications, although in practice, of course, a much larger number may be served by a common ROOT CMS. Accordingly, the figure should be understood as merely illustrative, and not limiting in this respect.

Two types of IP nodes are also shown in the figure: The base stations 321-323 (referred to as eNodeBs in the context of LTE), and the SEGs 330. As explained in more detail below, the SEGs 330 in the architecture as illustrated are securely interconnected, and each SEG is securely connected, by for example an IPSec tunnel, to a respective group of base stations 321, 322, or 323. For the purpose of establishing secure connections, the base stations are IKE peers of each other, and the SEGs are likewise IKE peers of each other.

It should be understood in this regard that although we have assumed herein that IPsec is the secure protocol chosen for RAN communications, the choice of IPsec is merely exemplary and not limiting. Examples of other secure protocols that may be useful in the present context include https and TLS.

In typical implementations, one single trusted authority, such as the owner of the mobile infrastructure or the operator of the backhaul network, will be associated with the one single ROOT CMS.

As we noted above, is advantageous, given a large mobile infrastructure and many nodes, to subdivide the RAN network into several distinct regions, each including a geographically clustered plurality of base stations. Three regions 361-363 are illustrated in FIG. 3. As explained above, the drawing was limited to three regions for simplification and not for purposes of limitation. Similarly, the number of base stations shown for each region in the drawing was limited to three to simplify the drawing and not for purposes of limitation.

As noted above, the SEGs 330 of FIG. 3 are securely interconnected, and each of the SEGs is securely connected to a respective group of base stations. More specifically, to provide secure communication within a given region, the base stations in each of the regions 361-363 directly connect to their respective SEG 330 via IPsec tunnels 351, 352, or 353. For secure communication between regions, IPsec tunnels 340 between SEGs across the regions are used to protect the perimeter of each region.

The IPsec tunnels are established using known methods as prescribed, for example, by the IPsec suite of protocols. The IPsec set-up procedures are well known and need not be described here in detail. For convenience however, a brief review will now be presented:

IKE has a first phase with the objective of establishing a secure authenticated communication channel between two prospective IPsec peers, and a second phase with the objective of negotiating security associations (SAs) between the peers on behalf of IPsec or other services. The SAs are negotiated using the secure channel established in phase 1.

There are several alternative methods that the peers may use to authenticate themselves during IKE phase 1, one of which must be agreed upon or preselected. One such method, which is of specific interest in the present context, uses a digital certificate authenticated by an RSA signature. Each peer sends to the other peer an ID value of its own, its identity digital certificate, and an RSA signature value. Each peer obtains its digital certificate by registering with a certification authority (CA) and having the certificate issue after the peer's credentials have been verified. The contents of the certificate typically include the identity and IP address of the certificate bearer, the serial number and expiration date of the certificate, and a copy of the bearer's public key.

As noted above, in a multilevel network, a delegation chain of certificates defines a trusted path extending from an IP host at the bottom of the network all the way to a trusted anchor at or near the top of the network. Accordingly, during IKE authentication, each peer exchanges a bundle of certificates, which forms the delegation chain of certificates. If the delegation chain can be validated, certificate-to-certificate, from the trusted anchor to the peer certificate, then the IKE peer is authenticated. For the authentication procedure to complete successfully, each IKE peer needs to be provisioned with the correct bundle of certificates, or else the IKE authentication phase will fail.

IKE phase 1, if successful, establishes a secure tunnel between the peers. Using the secure tunnel, IKE phase 2 negotiates the parameters for an SA between the peers and establishes the SA, thereby creating an IPsec tunnel. Packets exchanged between the peers using the IPsec tunnel are encrypted and decrypted according to the SA parameters that have been established.

In exemplary implementations, the eNodeB is the initiator of the authentication procedure. The procedure may be initiated, for example, when a new eNodeB goes online, or when the system software is updated to support authentication certificates for the first time, or when secure channels are being established for the first time for transmitting sensitive information over public transport networks or over the backhaul.

It should be noted in this regard that in the architectures that we describe here, eNodeBs are not IKE peers of each other; that is, IPsec tunnels are not established between eNodeBs. That particular design choice should be understood as merely exemplary and not limiting. If desired, our infrastructure can readily accommodate authentication between eNodeBs interconnected via tunnels. In many cases, however, such interconnection will be disfavored because a proliferation of links between network nodes may lead to network that is too complex, and therefore less economical than one in which the eNodeBs intercommunicate indirectly, via their shared SEGs.

It will be understood from the above discussion that a Certification Authority (CA) must be available to issue digital certificates to the SEGs and the base stations. This is necessary so that within each region, the SEG and the base stations can mutually authenticate each other when IPsec is initialized and the IKE protocol is invoked, and so that the SEGs located in the perimeters of different regions can likewise mutually authenticate each other.

In the arrangement of FIG. 1, the base stations and the SEGs all trust the same ROOT CMS, which consequently can serve as the Certification Authority. This may be the case if, for example, a single authority owns and operates the base stations and the SEGs.

However, it may also happen that different authorities own, respectively, the base stations and the SEGs. In such a case, one of the authorities may want to use its own external Certification Authority (CA), whereas the other authority uses the root CMS as its CA. An example of such a divided scenario is provided in FIG. 6.

CMS Hierarchical Models

We will describe several different Certification Authority (CA) hierarchical models of certification management and delegation that can be supported by our infrastructure. Each model is meant to address a different scenario that the wireless operator may need to support.

Three exemplary models are:
1. Hierarchical CMS without operator CA: The Wireless Service Provider does not own an operator CA. The base station and the SEG trusted anchor is the ROOT CMS.
2. Hierarchical CMS with operator CA: The Wireless Service Provider owns an operator CA. The base station and the SEG trusted anchor is the operator CA. The value added is that the CMS infrastructure allows automation of the base station certificate management of the operator CA certificates.
3. Direct Cross-Certification Model with Operator CA: The base station and the SEG are owned by different authorities and they trust different anchors. The SEG operator owns an operator CA. The base station trusts the ROOT CMS and the SEG trusts the operator CA. The value added is that the operator can bridge the communication between the operator CA and the ROOT CMS and automate the management of the base station certificates.

Although the foregoing models are fundamentally different in the way that they construct the trusted path, only a relatively small amount of further development would be needed to extend the CMS infrastructure developed for one of the models so that the other models are likewise supported. This is due to the fact that the respective models differ mainly in the content of the certificate bundles, but the CMS infrastructures and the delivery mechanisms and procedures are substantially the same.

Hierarchical Model Without Operator CA

FIG. 3 shows the CMS high level architecture components when a single authority is trusted by the base station and the SEGs and the operator does not own an external CA. In this model, the CMS infrastructure automates the request for certificates and the distribution of certificates in the base station, to authenticate the base station to the SEG. The model is hierarchical, in that the certificates are signed and passed down from the top to the bottom level. At the top of the hierarchy is the ROOT CMS 300. This is the trust anchor CA in the hierarchical infrastructure. The CA of the ROOT CMS issues certificates to the subordinate sur-CMS CAs 310 and to the SEGs 330. Each sur-CMS CA issues certificates to the base station end entities 321-323, respectively, for which it is responsible. The sur-CMS also issues certificates to the SEG with which it is associated.

The trust anchor, the certification path, and the storage location of the digital certificates for the base station and the SEG are shown in the following table for this model. In the storage location row, the following notation is used: X(Y) means CA X issues a digital certificate of the public key of the CA or end entity Y. The certificates are stored in the end entity located in the same authority domain as the issuer of the certificate.

|   | Base station | SEG |
|---|---|---|
| Trust Anchor | ROOT CMS | ROOT CMS |
| Certification Path | Base Station➡ sur-CMS➡ ROOT CMS | SEG➡ sur-CMS➡ ROOT CMS |
| Storage Location | ROOT CMS(ROOT CMS), ROOT CMS (sur-CMS), sur-CMS (base station) | ROOT CMS(ROOT CMS), ROOT CMS(sur-CMS), sur-CMS(SEG) |

Hierarchical Model With Operator CA

Figure 4:
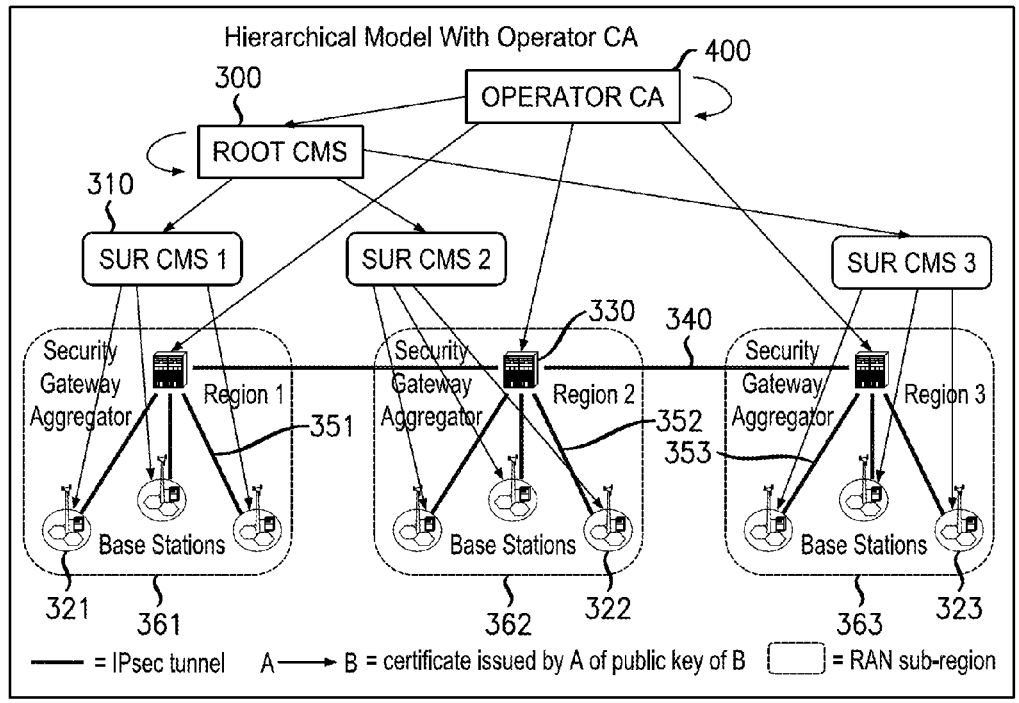

FIG. 4 shows the architecture when the operator owns an external CA 400 and the base station and the SEG trust the operator CA. In this model, the base station and the SEG trust anchor is the operator CA 400. The ROOT CMS 300 and the sur-CMS 310 are subordinate CAs that delegate the trusted path to the operator CA. The value added by CMS to this model is that the operator can automate the certificate management of the base station by adding a few certificates that the CMS infrastructure can distribute down to the base station in an automated manner.

The trust anchor, the certification path and the storage location of the digital certificates for the base station and the SEG are shown in the following table for this model.

|   | Base station | SEG |
|---|---|---|
| Trust Anchor | Operator CA | Operator CA |
| Certification Path | Base Station➡ sur-CMS➡ ROOT CMS➡ Operator CA | SEG➡ Operator CA |
| Storage Location | Operator CA(Operator CA), Operator CA (ROOT CMS), ROOT CMS (sur-CMS), sur-CMS (base station) | Operator CA (Operator CA), Operator CA(SEG) |

Direct Cross-Certification Model with Operator CA

Figure 5:
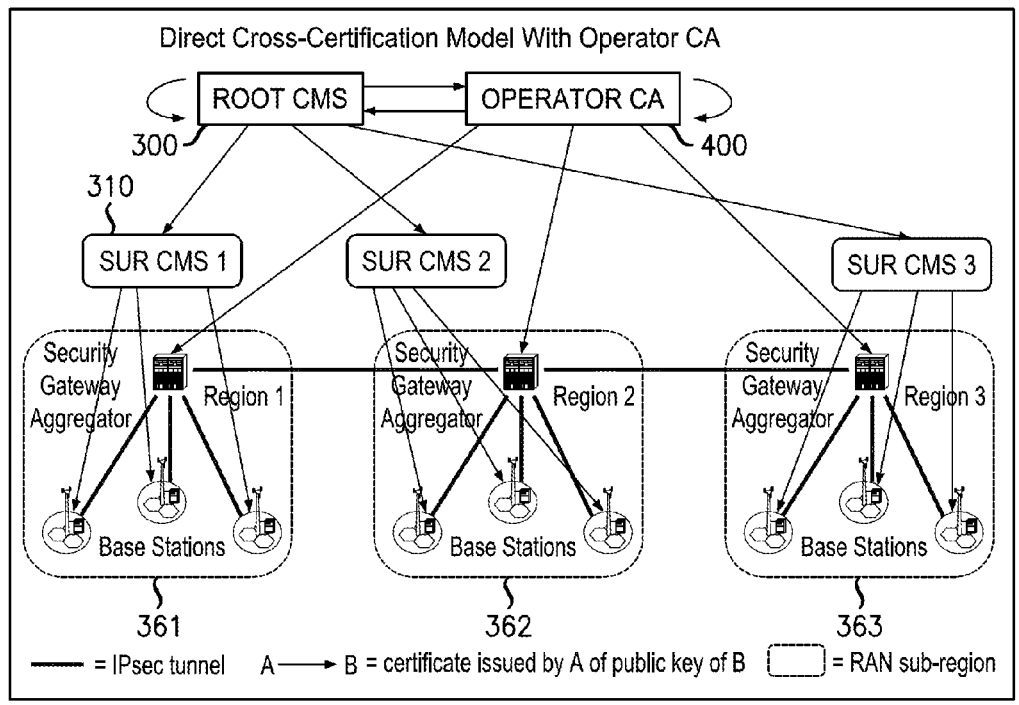

FIG. 5 shows the direct cross-certification model with operator CA 400. In this model, the base station and the SEG belong to two separate network security domains, and they trust different authorities that are not directly connected to the IKE peer. To establish a trusted relationship, each authority establishes trust with the other by issuing bidirectional cross-certificates directly between the ROOT CMS CA 300 and the operator CA 400. The cross-certification is achieved via agreements between the two authorities.

This model is suitable, e.g., to scenarios in which the mobile operator is the base station authority, the transport operator is the SEG authority, and each authority wants to maintain an independent domain of trust (with respect to network security). This model is also useful to support backhaul sharing when the base station and the transport have different operators who do not share network security domains.

This model is advantageous because it is simple to implement, it shortens the certification path, and it can establish a trust relationship expeditiously between two independent CAs. A further advantage is that even if the SEG operator does not trust the CMS infrastructure, the base station can use the automated capabilities offered by the CMS infrastructure to download the certificates, including the cross certificates signed by the operator CA, via the sur-CMS.

An important aspect of this model is that to authenticate the SEG, the base station only needs to trust certificates signed by the CAs in its own security domain. That is, it only needs to trust the self-signed certificate of the ROOT CMS CA, and to trust the cross-certificate of the operator CA public key, which is also issued by the ROOT CMS CA. More specifically, the certificate issued by the operator CA and received from the SEG during IKE can be validated by the base station using the two certificates issued in the base station security domain. Analogously, the SEG only needs to trust certificates signed by CAs in its own security domain to authenticate the base station.

The trust anchor, the certification path, and the storage location of the digital certificates for the base station and the SEG are shown in the following table for this model.

|   | Base station | SEG |
|---|---|---|
| Trust Anchor | ROOT CMS | Operator CA |
| Certification Path | Base Station➡ sur-CMS➡ ROOT CMS➡ Operator CA | SEG➡ Operator CA |
| Storage Location | ROOT CMS(Operator CA), ROOT CMS(ROOT CMS), ROOT CMS(sur-CMS), sur-CMS (Base Station) | Operator CA (Operator CA), Operator CA(ROOT CMS), Operator CA(SEG) |

Figure 6:
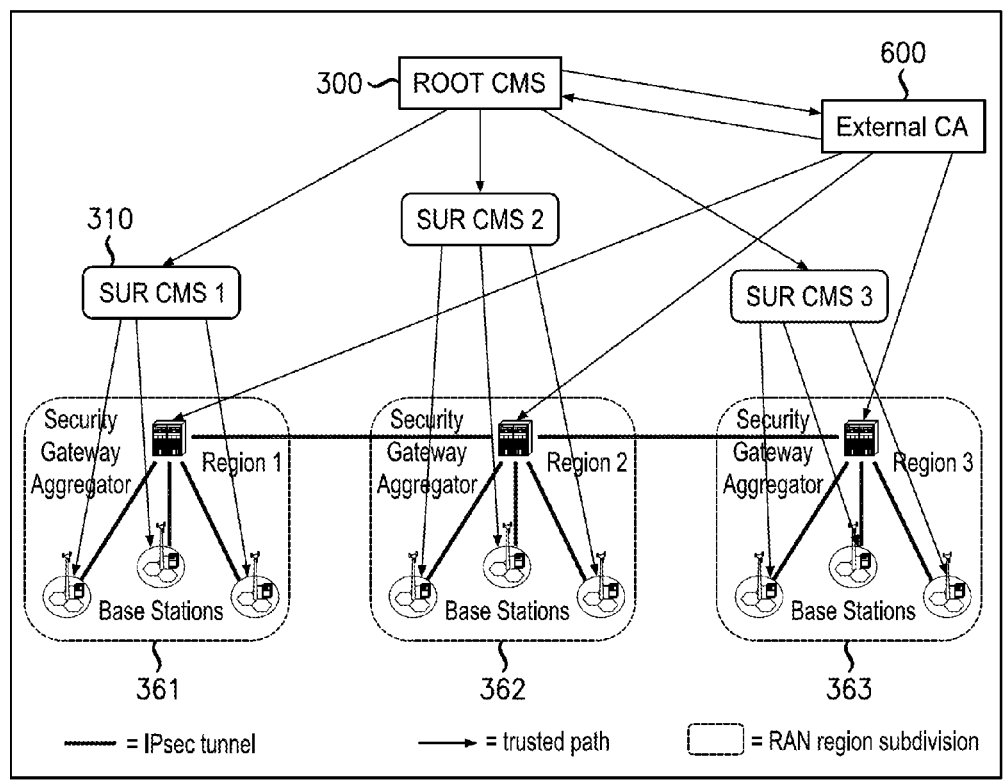
FIG. 6 is a schematic diagram of a model in which there are two trusted authorities. That is, the base stations trust the CA of the ROOT CMS, and the SEGs trust an external CA.

A further model is Cross-Certification With External CA, as shown in FIG. 6. It will be understood from the figure that this model is topologically similar to the model of FIG. 5. However, the external CA 600 is not owned by the network operator. Instead, it is a third party that has agreed, for example, to provide certificate management services. In this case, the pertinent private key is owned by the external CA, and not by the network operator.

Example 1

Figure 7:
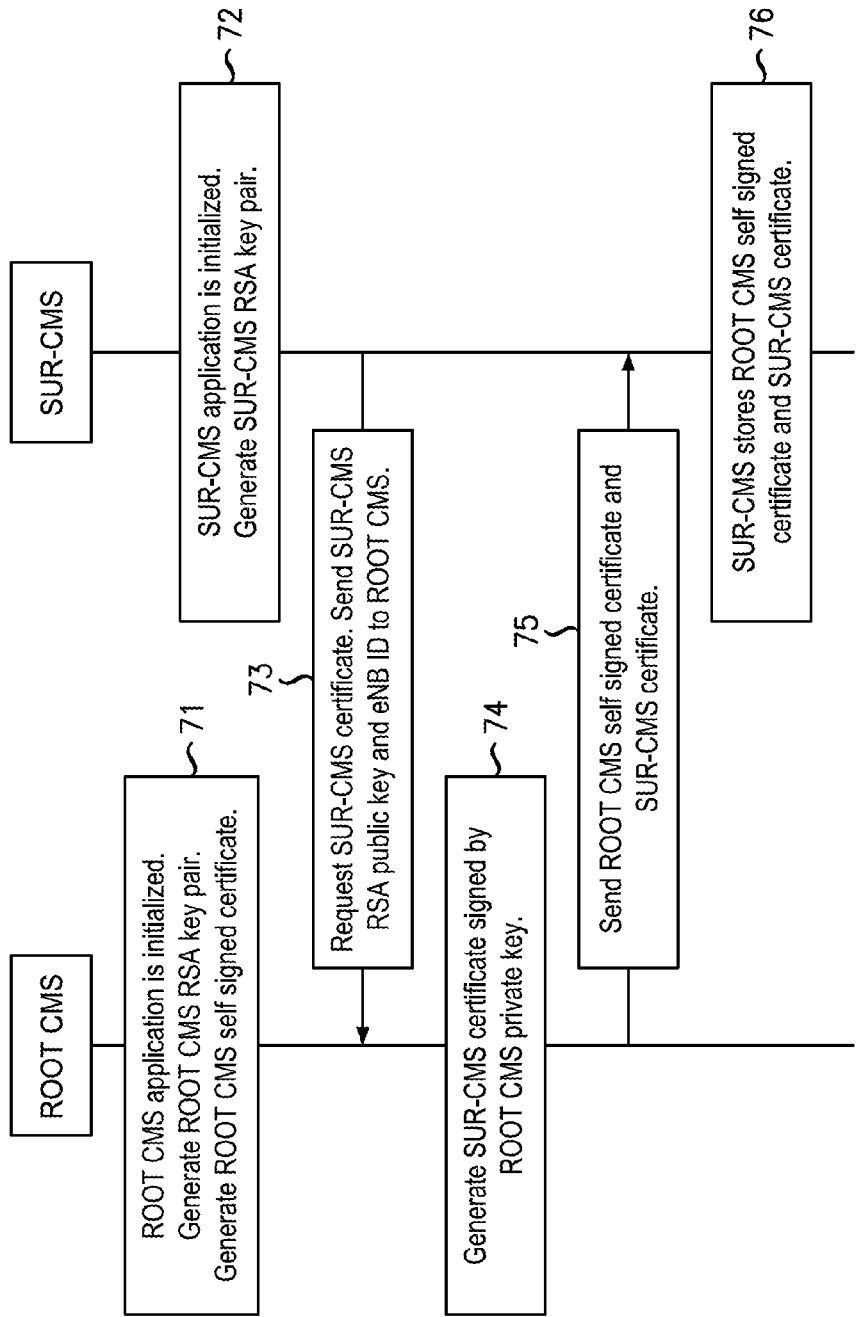
FIGS. 7-11 are protocol messaging diagrams illustrating several use cases of digital certificate management as described herein.

FIG. 7 illustrates a transaction which results in a sur-CMS obtaining a certificate bundle consisting of the ROOT CMS self-signed certificate and the sur-CMS certificate. As seen in the figure at block 71, the ROOT CMS application is initialized, and at the ROOT CMS, a ROOT CMS public-private key pair (according to the RSA protocol, in this example) is generated and the ROOT CMS self-signed certificate is generated.

At block 72, the sur-CMS application is initialized, and it generates an RSA key pair. At block 73, the sur-CMS sends a certificate request to the ROOT CMS, including its RSA public key and base station identities. At block 74, the ROOT CMS generates the sur-CMS certificate and signs it with its private key. At block 75, the ROOT CMS sends its own self-signed certificate and the sur-CMS certificate to the sur-CMS. At block 76, the sur-CMS stores the received certificate bundle.

Example 2

Figure 8:
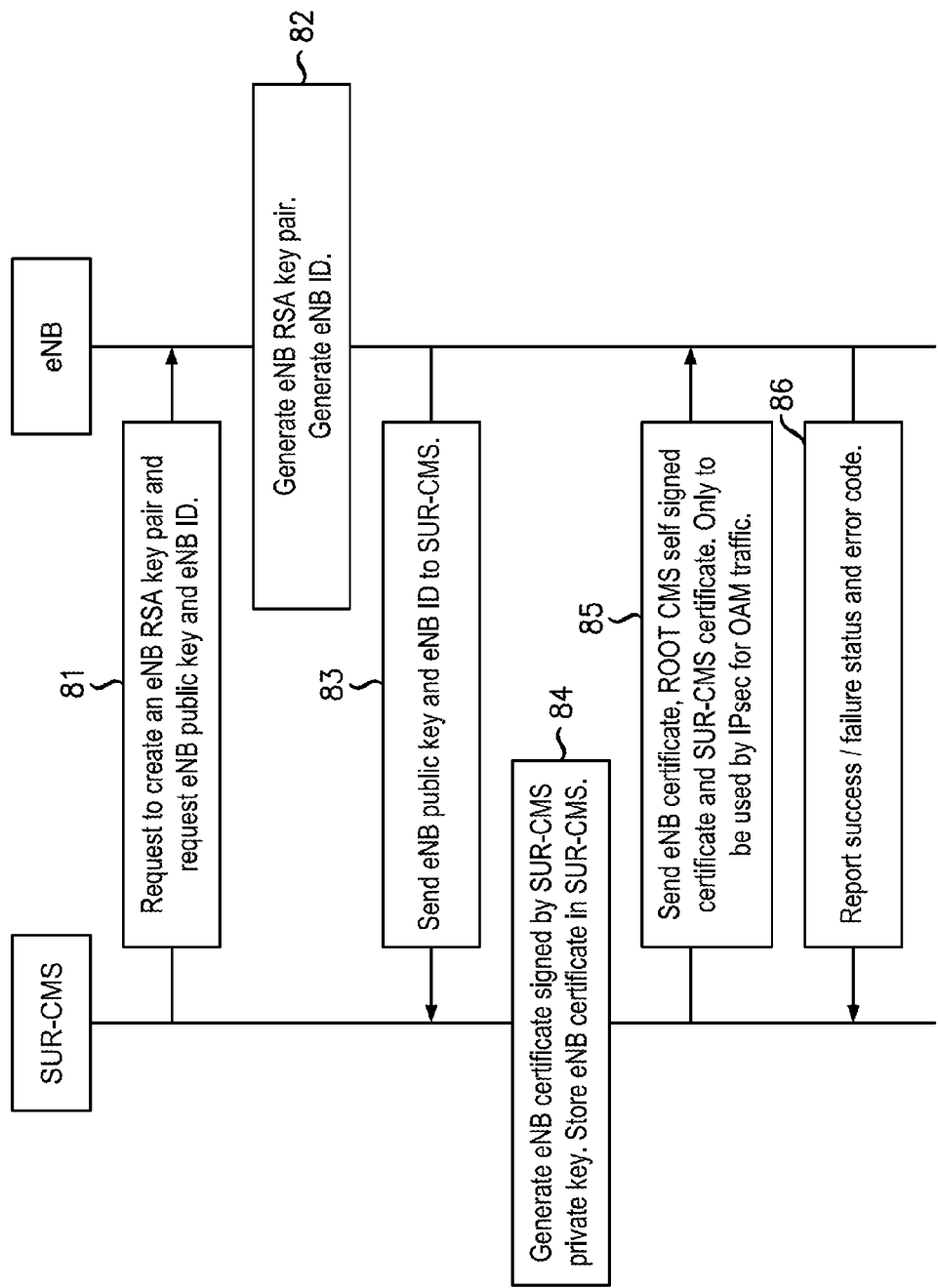
Figure 9:
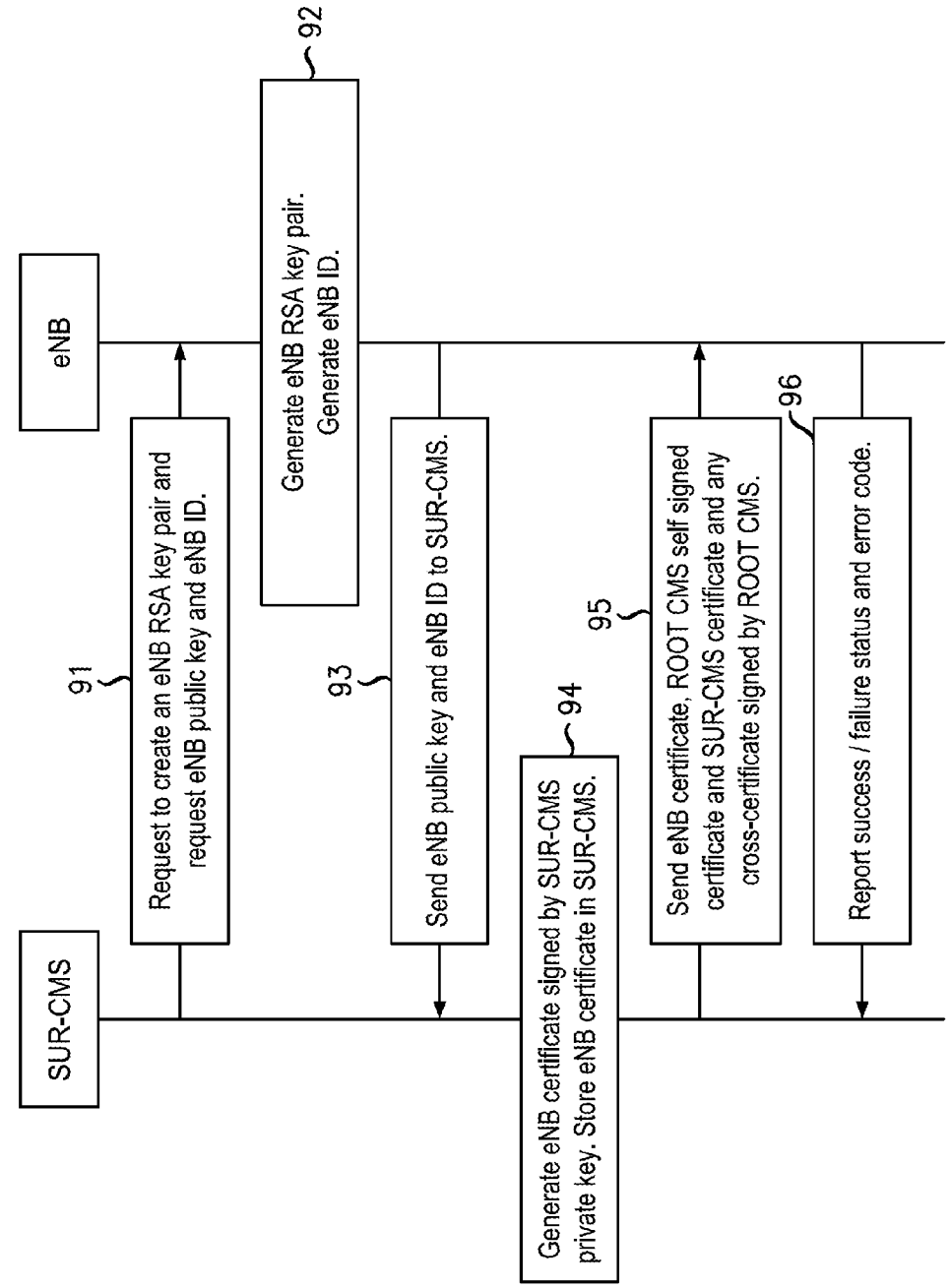

FIGS. 8 and 9 illustrates a transaction in which a new or upgrated backhaul control board in a base station downloads digital certificates. In FIG. 8, the download is by a new board and via a local CMS application. In FIG. 9, it is by an existing board and via a CMS application located remotely.

As seen in the figures, the sur-CMS sends a request to the base station to create an RSA key pair and to send the public key and identity of the base station (blocks 81 and 91). The base station generates the key pair and base station ID (blocks 82 and 92), and sends the public key and ID to the sur-CMS (blocks 83 and 93). The sur-CMS generates the base station certificate and signs it with the private key of the sur-CMS, and stores the certificate (blocks 84 and 94). The sur-CMS sends the base station certificate, its own certificate, and the certificate self-signed by the ROOT CMS to the base station (blocks 85 and 95).

In the transaction of FIG. 8, the use of the certificates is limited to OAM traffic secured under the IPsec protocols. In the transaction of FIG. 9, there is no such limitation, and the sur-CMS also includes in the certificate bundle cross-certificates (if any) signed by the ROOT CMS.

The base station reports to the sur-CMS on the success or failure of the transaction, with error codes as appropriate (blocks 86 and 96).

Example 3

Figure 10:
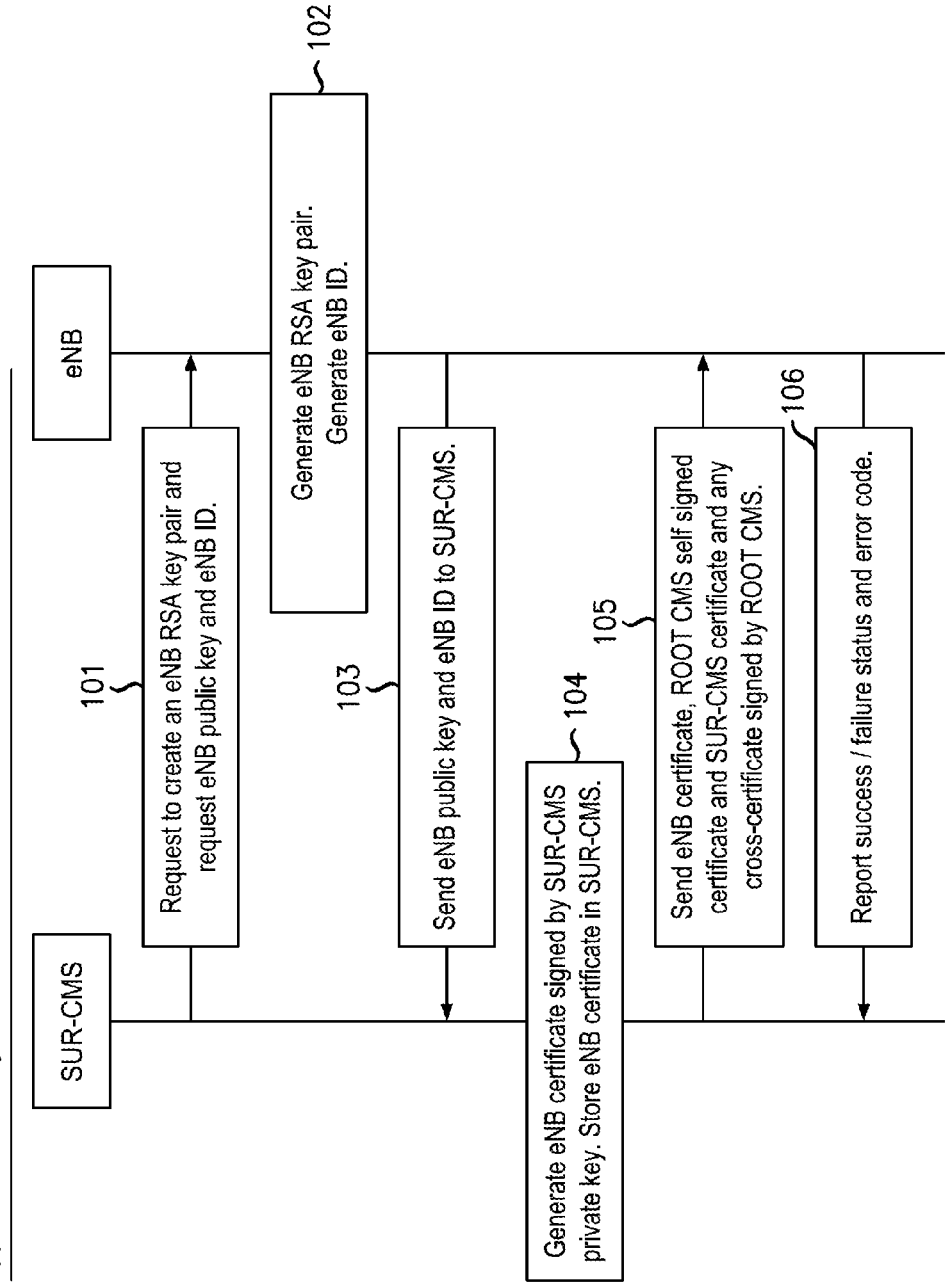
Figure 11:
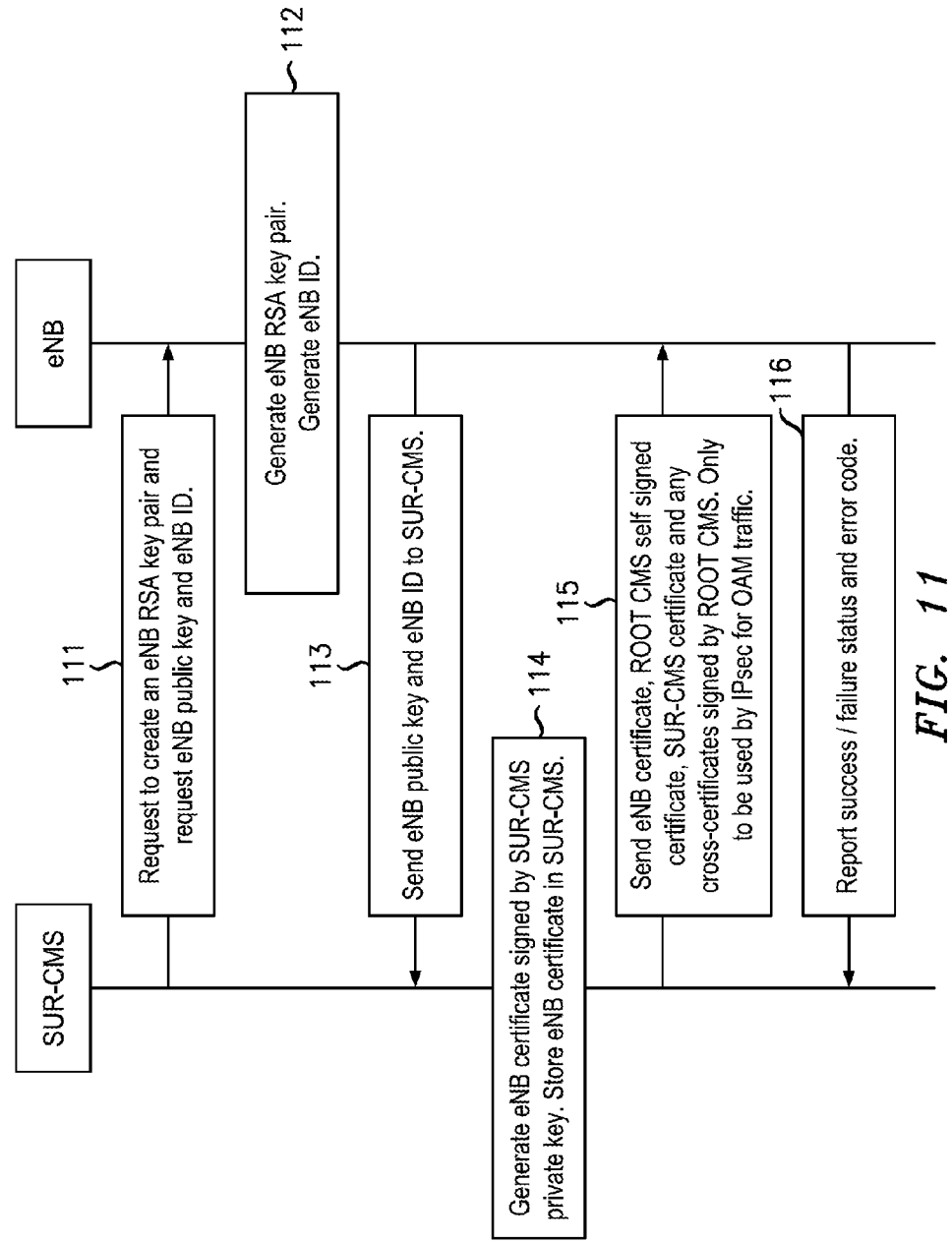

FIGS. 10 and 11 illustrates a transaction in which a new or upgrated backhaul control board in a base station downloads digital certificates. In FIG. 10, the download is by a new board and via a remote CMS application. In FIG. 11, it is by an existing board in a central location in the operator premises, but not connected to the eRAN (i.e., the LTE evolved radio access network) backhaul.

As seen in the figures, the sur-CMS sends a request to the base station to create an RSA key pair and to send the public key and identity of the base station (blocks 101 and 111). The base station generates the key pair and base station ID (blocks 102 and 112), and sends the public key and ID to the sur-CMS (blocks 103 and 113). The sur-CMS generates the base station certificate and signs it with the private key of the sur-CMS, and stores the certificate (blocks 104 and 114). The sur-CMS sends to the base station the base station certificate, its own certificate, the certificate self-signed by the ROOT CMS, and any cross-certificates signed by the ROOT CMS (blocks 105 and 115). In the transaction of FIG. 11, the use of the certificates is limited to OAM traffic secured under the IPsec protocols.

The base station reports to the sur-CMS on the success or failure of the transaction, with error codes as appropriate (blocks 106 and 116).

We claim:

1. A system, comprising:
   a digital storage device; and
   one or more processors in communication with the digital storage device, the one or more processors being configured to implement:
      a root certificate management system (root CMS) configured to process requests for digital certificates and to issue root certificates, and configured to automatically authenticate surrogate certificate management systems (sur-CMSs), and configured to automatically process certificate requests and to issue certificate bundles to sur-CMSs that are successfully authenticated; and
      two or more sur-CMSs, each of said two or more sur-CMSs having one or more base stations assigned to it within a respective region;
      wherein each of said two or more sur-CMSs is configured to automatically authenticate its own base stations, and configured to automatically process certificate requests and to issue certificate bundles to base stations that are successfully authenticated;
      wherein each certificate bundle issued to a base station includes: a digital certificate, signed by an issuing sur-CMS, of a public key of such base station; and at least one further digital certificate, including a self-signed certificate of the root CMS; and
      wherein each of said two or more sur-CMSs is configured to receive a signal from a base station indicating a success or failure of an authenticating transaction relating to a certificate bundle.

2. The system of claim 1, wherein the root CMS and at least one of said two or more sur-CMSs are further configured to automatically authenticate at least one security gateway aggregator (SEG) in one or more of the respective regions and to automatically process certificate requests and to issue certificate bundles to SEGs that are successfully authenticated.

3. The system of claim 1, wherein the root CMS is configured to be authenticated by a certification authority (CA) and to receive a digital certificate issued by the CA, wherein the digital certificate binds a public key to the root CMS.

4. The system of claim 3, wherein each certificate bundle issued to a base station further includes said digital certificate that binds a public key to the root CMS, and further includes a self-signed certificate of the CA.

5. The system of claim 3, wherein the root CMS is configured to authenticate the CA and to process certificate requests and to issue a digital certificate to the CA, wherein the digital certificate binds a public key to the CA.

6. A method to be performed in a wireless network of the kind that uses a certificate management system (CMS) to distribute digital certificates, comprising:
   performing, by a surrogate CMS (sur-CMS), an authentication procedure that results in the sur-CMS obtaining a digital certificate from a root CMS;
   automatically authenticating, by the sur-CMS, one or more base stations; and
   automatically issuing, by the sur-CMS, a digital certificate bundle to each authenticated base station, wherein the bundle includes a digital certificate, signed by the issuing sur-CMS, of a public key of such base station; and at least one further digital certificate, including a self-signed certificate of the root CMS, and
   wherein the sur-CMS is configured to receive a signal from a base station indicating a success or failure of an authenticating transaction relating to a certificate bundle.

7. The method of claim 6, further comprising:
   automatically authenticating, by the sur-CMS, at least one security gateway aggregator (SEG), and
   automatically issuing, by the sur-CMS, a digital certificate bundle to each authenticated SEG.

8. The method of claim 6, wherein the digital certificate bundle issued to each authenticated base station further includes a digital certificate, issued by the root CMS, of a Certification Authority distinct from the root CMS.

9. A method to be performed in a wireless network of the kind that uses a certificate management system (CMS) to distribute digital certificates, comprising:
   performing, by a base station, an authentication procedure that results in the base station receiving a digital certificate bundle from a surrogate CMS (sur-CMS); and
   performing, by the base station, an authentication procedure that results in the base station setting up a secure tunnel with a security gateway aggregator (SEG);
   wherein the certificate bundle received from the sur-CMS includes a digital certificate signed by the sur-CMS, and a digital certificate self-signed by a root CMS; and
   wherein the base station is configured to transmit to the sur-CMS a signal indicating a success or failure of an authenticating transaction relating to a certificate bundle.

10. The method of claim 9, wherein:
the certificate bundle received from the sur-CMS further includes a digital certificate, issued by the root CMS, of a Certification Authority (CA) distinct from the root CMS; and
the authentication procedure between the base station and the SEG uses at least:
the digital certificate self-signed by the root CMS, and
the digital certificate issued by the root CMS of a CA distinct from the root CMS.

* * * * *